US010290419B2

(12) United States Patent
Cunningham (10) Patent No.: US 10,290,419 B2
(45) Date of Patent: May 14, 2019

(54) POWER SUPPLY SYSTEMS (71) Applicant: Hunza Holdings Limited, Auckland (NZ)

(72) Inventor: Andrew William Cunningham, Auckland (NZ)

(73) Assignee: HUNZA HOLDINGS LIMITED, Auckland (NZ)

(*) Notice: Subject to any disclaimer, the term of this patent is extended or adjusted under 35 U.S.C. 154(b) by 0 days.

(21) Appl. No.: 14/443,033

(22) PCT Filed: Nov. 14, 2013

(86) PCT No.: PCT/NZ2013/000205
§ 371 (c)(1),
(2) Date: May 14, 2015

(87) PCT Pub. No.: WO2014/077703
PCT Pub. Date: May 22, 2014

(65) Prior Publication Data
US 2015/0332846 A1 Nov. 19, 2015

(30) Foreign Application Priority Data
Nov. 15, 2012 (NZ) .......................... 603646

(51) Int. Cl.
H01F 38/14 (2006.01)
H02J 3/00 (2006.01)
(Continued)

(52) U.S. Cl.
CPC ............ H01F 38/14 (2013.01); H01F 27/24 (2013.01); H02J 3/00 (2013.01); H02J 5/00 (2013.01);
(Continued)

(58) Field of Classification Search
CPC ...... H01F 38/14; H02J 5/005; Y02T 10/7005; Y02T 10/7072; Y02T 90/121
(Continued)

(56) References Cited

U.S. PATENT DOCUMENTS 4,833,338 A 5/1989 Bartlett et al.
5,293,308 A 3/1994 Boys et al.
(Continued)

FOREIGN PATENT DOCUMENTS

CN 201163726 Y 12/2008
WO 2012033417 A1 3/2012

OTHER PUBLICATIONS

International Search Report and Written Opinion for International Application No. PCT/NZ2013/000205 dated Mar. 6, 2014 (16 pages).
(Continued)

Primary Examiner — Thienvu V Tran
Assistant Examiner — David M Stables
(74) Attorney, Agent, or Firm — Fitch, Even, Tabin & Flannery LLP (57) ABSTRACT A power supply system including: a power supply configured to provide a constant AC current; a power transmission line connected to the power supply to form a closed circuit; and at least one pickup configured to accept and slidingly engage with the power transmission line such that the pickup completely encircles a portion of the power transmission line threaded through the pickup, and to inductively couple to the power transmission line, wherein the at least one pickup can be positioned at any point along the length of the power transmission line by sliding it along the power transmission line.

23 Claims, 3 Drawing Sheets (51) Int. Cl.
*H01F 27/24* (2006.01)
*H02J 5/00* (2016.01)
*H02J 7/02* (2016.01)
*H05B 41/24* (2006.01)
*H05B 37/02* (2006.01)
*H02J 50/10* (2016.01)

(52) U.S. Cl.
CPC ............... *H02J 5/005* (2013.01); *H02J 7/02* (2013.01); *H02J 50/10* (2016.02); *H05B 37/0263* (2013.01); *H05B 41/24* (2013.01); *Y10T 29/49021* (2015.01); *Y10T 307/297* (2015.04)

(58) Field of Classification Search
USPC ............ 307/11, 12, 17, 37, 42, 104; 191/10; 324/95
See application file for complete search history.

(56) References Cited

U.S. PATENT DOCUMENTS

| | | | | |
|---|---|---|---|---|
| 5,774,320 | A * | 6/1998 | Seymour | H01F 38/30 336/131 |
| 6,005,304 | A * | 12/1999 | Seelig | H02J 5/005 307/104 |
| 7,646,279 | B2 | 1/2010 | Limpkin | |
| 2003/0201862 | A1 | 10/2003 | Arntz et al. | |
| 2005/0073200 | A1* | 4/2005 | Divan | H01F 30/16 307/44 |
| 2007/0109708 | A1* | 5/2007 | Hussman | H02J 1/00 361/113 |
| 2007/0236159 | A1 | 10/2007 | Beland | |
| 2008/0116847 | A1* | 5/2008 | Loke | H02J 7/025 320/108 |
| 2010/0055990 | A1* | 3/2010 | Madeley | H01R 13/187 439/675 |
| 2011/0196541 | A1* | 8/2011 | Bauman | G05B 19/0421 700/284 |
| 2011/0254379 | A1 | 10/2011 | Madawala | |
| 2012/0001563 | A1 | 1/2012 | Rimmer et al. | |
| 2012/0013269 | A1 | 1/2012 | Chen et al. | |
| 2012/0025606 | A1 | 2/2012 | Zheng et al. | |
| 2012/0236611 | A1* | 9/2012 | Alexandrov | H02M 7/155 363/126 |

OTHER PUBLICATIONS

Written Opinion of the International Preliminary Examining Authority for International Application No. PCT/NZ2013/000205 dated Nov. 26, 2014. (8 pages).
International Preliminary Report on Patentability for International Application No. PCT/NZ2013/000205 dated Mar. 4, 2015 (48 pages).
Barnard, J.M. et al., "Sliding Transformers for Linear Contactless Power Delivery", IEEE Transactions on Industrial Electronics, vol. 44, No. 6, Dec. 1997, pp. 774-779.
Raabe, Stefan et al., "A High Power Coaxial Inductive Power Transfer Pickup", IEEE, vol. 978, No. 1, 2008, pp. 4320-4325.

* cited by examiner

POWER SUPPLY SYSTEMS

CROSS-REFERENCE TO RELATED APPLICATIONS

This application is a U.S. national phase application of International Application No. PCT/ NZ2013/000205, filed Nov. 14, 2013, designating the U.S., which claims priority to New Zealand Patent Application No. 603646, filed Nov. 15, 2012, which is incorporated by reference herein in its entirety.

TECHNICAL FIELD

The present invention relates to improvements in and relating to power supply systems having an associated power transmission line. The present invention has particular advantage in situations in which one or more circuits may be added to, or removed from, the power supply system.

BACKGROUND ART

For the purposes of clarity the power supply system of the present invention will be described with respect to a small number of installations, rather than detailed in an exhaustive list of possible installations. In this regard the power supply system of the present invention should not be seen as being limited to the installations described below.

Lighting systems which are designed to operate in hazardous or adverse conditions, such as outdoors, in volatile environments, or underwater are typically custom designed or fitted by specialist installers. The reason for this is that the system needs to be sealed from the environment to ensure durability and reliable operation. In addition, in environments where flammable gases or the like are present the lighting system must be hermetically sealed to ensure no chance of ignition of gasses is possible.

One problem associated with custom designed power supply systems is that they are typically not configured for expandability. At the time of design the number of devices connected to the power supply network and the power consumption requirements of those devices is calculated. A power supply is chosen to provide a specified reliability at the calculated load. If further devices are desired to be connected to the network the loading requirements must be confirmed to be within the supply range of the power supply. Typically the power supply will provide a constant output voltage over a specified current range. Furthermore, connection of the new device will most likely require specialist installation to ensure connection of the new device conforms with the sealing requirements of the system.

It would therefore be useful to have a power supply system which allows for a number of varying load circuits to be easily and conveniently connected thereto without the need for specialist skills or a large number of tools.

It would also be useful to provide a system in which individual circuits connected to the power supply network can be controlled remotely without the need for additional wiring.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a power supply system including:
 a power supply configured to provide a constant AC current;
 a power transmission line connected to the power supply to form a closed circuit; and
 at least one pickup
wherein the pickup is configured to accept and slidingly engage with the power transmission line such that the pickup surrounds the portion of the power transmission line threaded through the pickup, and to inductively couple to the power transmission line, wherein the at least one pickup can be positioned at any point along the length of the power transmission line by sliding it along the power transmission line.

Reference throughout this specification to a pickup that surrounds the portion of the power transmission line threaded through the pickup should be understood to refer to a pickup that completely encircles the portion of the power transmission line threaded through it.

In preferred embodiments the power supply actively monitors the power transmission line to dynamically maintain a constant current there through. It will be appreciated by a person skilled in the art that as devices are coupled to, or removed from the power transmission line the current will fluctuate in accordance with Ohms law. Therefore dynamically monitoring and maintaining a constant current through the power transmission line allows for 'clip on' type pickups to be added to and removed from the power transmission line without interruption to the power provided to other devices coupled to the power transmission line.

A further advantage of constant current control is that resistive losses in the power transmission line are kept constant regardless of the number of pickups coupled to the power transmission line. This is particularly advantageous when the power transmission line is long.

In preferred embodiments the power supply is supplied by a mains power source. However, it should be appreciated that the power supply could be supplied by any number of power sources, such as, for example, batteries or solar panels.

In some embodiments the power supply incorporates a means for storage of electrical energy. Bulk energy storage in electronic circuits can be achieved in any number of ways; non limiting examples include batteries, capacitors, inductors or the like.

In preferred embodiments the power supply provides electrical isolation between the mains input supply and the power supply output.

In preferred embodiments the power supply includes an inverter circuit configured to provide an AC waveform.

Preferably the inverter produces a low voltage AC waveform in the range of around 500 Hz to 1 kHz. The AC output frequency may vary depending on the requirements of a particular power supply system installation, therefore the AC waveform frequency should not be seen as being limiting.

Preferably the inverter produces a pulse width modulated output of between 20 kHz and 100 kHz, particularly between 20 kHz and 40 kHz, and more particularly 32 kHz. It will be appreciated that the pulse width modulated output of an inverter may be configured to operate at any frequency, therefore the inverter pulse width output should not be seen as being limiting.

In preferred embodiments the inverter produces a pulse width modulated output of substantially 50 kHz.

Preferably the pulse width modulated output has an underlying pulse train corresponding to a sinusoidal waveform.

Preferably the underlying pulse train has a frequency of between 500 Hz and 1 kHz, particularly between 500 Hz and 800 Hz.

In preferred embodiments the underlying pulse train has a frequency of about 600 Hz.

In preferred embodiments the power supply includes a low pass filter capable of filtering high frequency components from the pulse width modulated output.

Preferably the filtered pulse width modulated output comprises an AC waveform having a frequency substantially corresponding to the frequency of the underlying pulse train.

Preferably the power supply actively monitors the power transmission line to dynamically maintain a constant current there through.

In some preferred embodiments the constant current level may be adjustable by a user of the power supply system.

In some preferred embodiments the power transmission line is an unbroken loop. Such an embodiment may require that pickups are at least two part and can be separated and reconnected around the transmission line. This allows a pickup to be coupled to the power transmission line without interruption to other devices coupled to the power transmission line. A number of two part embodiments are known in the art, such as pickups which include hinges, or which can be clipped together.

Alternatively a solid core pickup may be threaded onto the power transmission line during installation, for example by threading the power transmission line through the pickup, allowing a single continuous length of wire to be used. If additional light sources are to be connected the connection to the power supply may be disconnected to allow further pickups to be threaded on, or alternatively, the power transmission line could be cut. Once the pickup is threaded onto the power transmission line at the point of cutting the power transmission line can be re-joined. Because the power transmission line is monitored by the power supply, when the power transmission line is rejoined power is automatically restored and automatically adapts to the new load requirements.

Preferably embodiments in which the power transmission line is cut and may be re-joined are rejoined by way of a mechanical connection, such as, but not being limited to:
  soldering of the wire ends;
  joining the wire ends with a connector;
  braiding of the wire ends together;
  crimping of the wire ends; or
  twisting together of the wire ends.

In preferred embodiments the power transmission line comprises a plurality of power transmission line sections which can be joined by way of releasable electrical connections to form a closed circuit. A power transmission line which comprises a plurality of power transmission line sections provides the advantage of expandability, whereby if an additional length of power transmission line is required it can simply be connected into the existing power transmission line at one of the releasable electrical connections.

In preferred embodiments the releasable electrical connections allow for a pickup to be threaded over one of the releasable electrical connections and onto a section of power transmission line. By threading a pickup onto a section of power transmission line a more efficient and entirely sealed pickup can be coupled to the power transmission line, rather than a two-piece pickup which is configured to clip onto a power transmission line.

In some preferred embodiments the power transmission line may comprise a plurality of separate transmission lines. By employing multiple transmission lines, like devices can be coupled to a specific transmission line or series of transmission lines. This allows for important devices to be coupled to a dedicated transmission line. Devices which are less important can then be coupled to a separate transmission line. This allows less important devices to be added or removed without interfering with important devices coupled to a separate power transmission line.

In some preferred embodiments a separate communications line forms a part of the power transmission line.

In preferred embodiments the power transmission line is configured to propagate communications signals induced thereon.

According to a second aspect of the present invention there is provided a pickup for use with a power supply system having a power supply configured to provide a constant AC current and a power transmission line connected to the power supply to form a closed circuit, wherein the pickup is configured in use, to thread onto and inductively couple to the power transmission line and is capable of being positioned at any point along the length of the power transmission line.

Preferably the pickup is configured to surround the power transmission line or part thereof.

In some embodiments the pickup includes a solid core. A solid core pickup is typically more efficient than a pickup which comprises two or more cores. The reason for this is that the core can be formed in a single homogenous structure.

Preferably the pickup includes a solid core formed from amorphous steel ribbon, a non-limiting example of which is Metglas 2605SA1 ribbon.

In preferred embodiments the pickup can be positioned at any location along the length of the power transmission line. In embodiments which include a solid core a pickup can be positioned, or moved, along the power transmission line by simply sliding the pickup along the power transmission line to the desired location.

In preferred embodiments the solid core pickup may be sealed against the environment. Sealing against the environment allows the system to be used for both indoor and outdoor use without the need for any modification.

Preferably the solid core pickup is sealed against the environment to ingress protection IP68 level.

In some embodiments the pickup may include two or more core sections which can be releasably attached to one another, either by way of a hinge, or by releasable clips, thereby allowing the core sections to be separated and reconnected around the power transmission line. A separable core allows for coupling between the power transmission line and the pickup without the need to interrupt the ac current flowing through the power transmission line.

According to a third aspect of the present invention there is provided a circuit including a pickup, the circuit including a switched mode power supply configured to supply a load of varying wattage whilst drawing a constant input current.

Preferably the circuit includes a light source. Innumerable light sources are available that are suitable for use with the power supply system, non limiting examples include:
compact fluorescent light sources;
LEDs;
halogen light sources; and
HID light sources.

People skilled in the art will appreciate that different types of light sources may require additional circuitry to convert the constant current supplied by way of the power transmission line to an appropriate current and voltage for use by the light source.

Preferably the circuit includes a communications interface configured to receive signals inductively communicated by way of the pickup. Having a pickup capable of receiving signals inductively enables the circuit to communicate without direct physical connection to the power transmission line.

In preferred embodiments the communications interface is capable of transmitting signals by inductively coupling said signals to the power transmission line.

Preferably the circuit can be remotely controlled by way of a signal transmitted on the power transmission line.

Preferably the circuit can be positioned at any location along the length of the power transmission line.

In preferred embodiments the power supply circuit includes a communications interface coupled to the at least one power transmission line (or another dedicated communications line), wherein a control signal can be communicated from the communications interface to one or more of the plurality of pickups coupled to the power transmission line.

Preferably the power supply circuit includes an interface configured to receive signals from an external source and wherein the received signals are communicated on the power transmission line as instructions to one or more circuits coupled to the power transmission line.

Preferably the interface configured to receive signals from an external source includes one or more of, but in not limited to:
an internet connection;
a wireless connection;
a cellular network connection;
an interface with a control panel.

According to a fourth aspect of the present invention there is provided a method of inductively coupling a pickup to a length of power transmission line having at least one releasable connection and forming a closed circuit connected to, and supplied with constant AC current from, a power supply, wherein the pickup can be positioned at any point along the length of the power transmission line, the method including the steps of:
a) breaking the closed circuit power transmission line by separating the at least one releasable electrical connection;
b) threading the pickup over at least part of the releasable electrical connection and onto the power transmission line at the separation, and
c) re-connecting the releasable electrical connection to re-form the power transmission line closed circuit.

According to a fifth aspect of the present invention there is provided a method of controlling a circuit having a communications interface, the circuit inductively coupled to a length of power transmission line by way of a pickup, the power transmission line forming a closed circuit connected to, and supplied with constant AC current from, a power supply also having a communications interface, the method including the steps of:
a) operating the communications interface associated with the power supply to transmit a signal on the power transmission line, the signal configured to provide instructions to the circuit;
b) receiving the signal by way of the communications interface associated with the circuit, and
c) operating the circuit in accordance with the instructions within the transmitted signal.

According to a sixth aspect of the present invention there is provided a method of performing diagnostics on a power supply system including a power transmission line forming a closed circuit connected to, and supplied with, constant AC current from a power supply having a supply communications interface, the method including the steps of:
a) using a pickup to inductively couple a diagnostics circuit including a diagnostic circuit communications interface to the power transmission line;
b) using the diagnostics circuit communications interface to send commication signals to another circuit coupled to the power transmission line;
c) controlling at least one circuit using the communicated signal
wherein the pickup is configured to accept and slidingly engage with the power transmission line such that the pickup surrounds a portion of the power transmission line threaded through it, and to inductively couple to the power transmission line, wherein the pickup can be positioned at any point along the length of the power transmission line or circuit by sliding the pickup along the power transmission line or circuit.

Preferred embodiments of the present invention may provide a number of advantages over the prior art, including:
providing a simple and user friendly power supply system to which additional circuits can be dynamically added;
providing a power supply system to which additional circuits can be added without the need for tools, or alternatively with the need for very few tools;
providing a power supply system having a power transmission line and integrated communications network for communicating with circuits coupled to the power transmission line.

BRIEF DESCRIPTION OF THE DRAWINGS

Further aspects of the present invention will become apparent from the following description which is given by way of example only and with reference to the accompanying drawings in which.

BEST MODES FOR CARRYING OUT THE INVENTION

Figure 1:
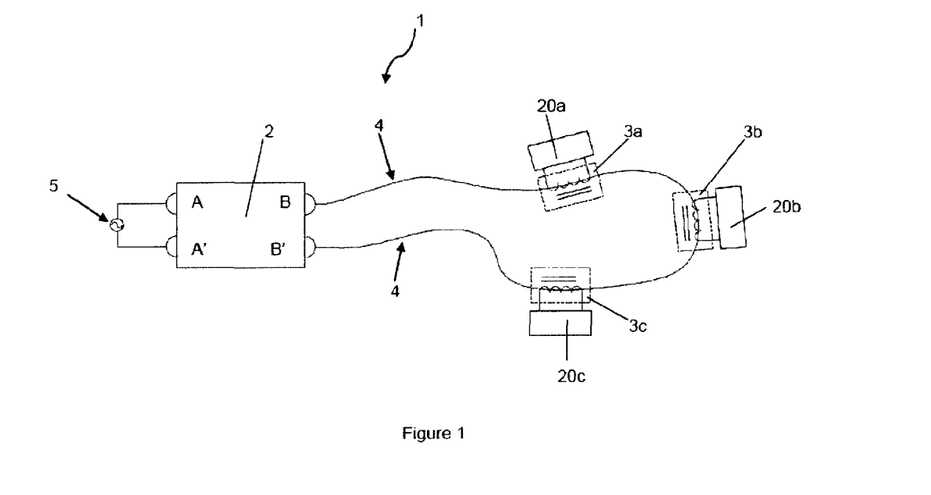
FIG. 1 is a schematic view of a power supply system in accordance with a first embodiment of the present invention.

With respect to FIG. 1 there is shown a power supply system as generally indicated by designator 1. The power supply system 1 includes power supply 2 which is connected by way of connections B, B' to power transmission line 4. Power supply 2 is configured to provide a constant AC current through power transmission line 4. Inductively coupled to the power transmission line 4 are pickups 3a, 3b and 3c. It will be appreciated that additional pickups may be inductively coupled to the power transmission line 4, or conversely, any one of pickups 3a, 3b or 3c may be removed from being inductively coupled to the power transmission line 4. Power supply 2 is supplied by way of connection to mains power supply 5 by way of connections A, A'.

Figure 2:
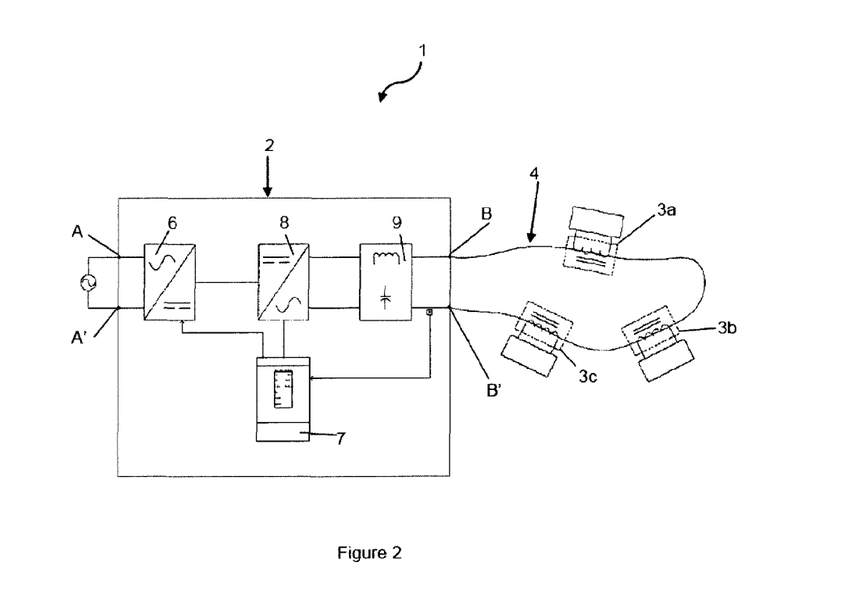
FIG. 2 is a schematic view of a power supply system in accordance with a further embodiment of the present invention.

With respect to FIG. 2 there is shown a schematic of power supply 2 of the power supply system 1 shown in FIG. 1. Power supply 2 includes inputs A, A' configured for connection to a supply of electrical energy. In FIG. 1 the source of electrical energy is shown as being provided by way of connection to an AC mains electricity supply. Input electrical energy from connections A, A' is converted by way of switch mode power supply 6 to a regulated DC voltage. Switch mode power supply 6 includes bulk storage capacity in the form of output capacitor's which are maintained substantially at the regulated DC voltage. The regulated DC voltage maintained by switch mode power supply 6 is controlled by way of microcontroller 7. Switch mode power supply 6 provides electrical isolation between inputs A, A' and outputs B, B'.

Outputs B, B' which are configured to connect to a power transmission line (designated as 4 in FIG. 1). Microprocessor 7 monitors the current being supplied by way of outputs B, B' and adjusts the regulated DC voltage output of switch mode power supply 6 and/or the pulse width modulated duty cycle output of inverter 8 in order to maintain a constant current level in the power transmission line 4. It will be appreciated that as additional pickups are inductively coupled to, or removed from being inductively coupled to, the power transmission line 4 (shown in FIG. 1), the RMS voltage measured across output connections B, B' will increase or decrease. Microprocessor 7 measures the output current and adjusts the regulated DC voltage output and pulse width modulated duty cycle of inverter 8 to maintain the desired level of power transmission line 4 current.

Figure 3:
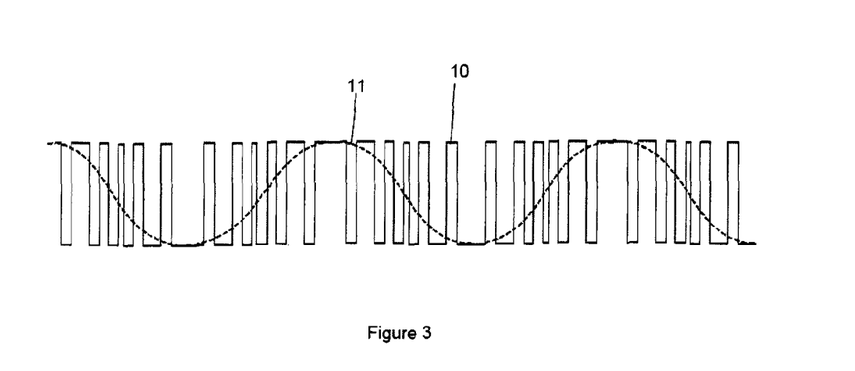
FIG. 3 is a waveform showing the output of an inverter.

The power supply 2 also includes an inverter 8 which converts the regulated DC voltage output of switch mode power supply 6 to a pulse width modulated output in the form of a modified sine wave, which for clarity is illustrated in FIG. 3, as designated by arrow 10. The modified sine wave 10 is fed into low pass filter 9 which removes high frequency harmonic components and thereby produces a sinusoidal current output, as shown in dashed lines designated by arrow 11 in FIG. 3. The switching frequency of inverter 8 is preferably between 30 kHz and 100 kHz, this frequency range is at, or above, the upper limit of human hearing but is low enough to mitigate undesirable radiated emissions. The modified sine wave produced by inverter 8 has an underlying frequency of approximately 600 Hz. It will be appreciated by a person skilled in the art that any number of frequencies could be used, however as the underlying frequency increases the physical dimensions of the pickups used to couple to the power transmission line 4 become smaller, radiated emissions increase and skin effects become more prevalent. Therefore a frequency must be chosen which achieves a suitable compromise between transformer size, the level of radiated emissions and the losses associated with skin effect.

By utilising an AC current, energy can be transferred from power transmission line 4 to pickups 3a, 3b and 3c without physical interconnection there between, the energy transfer occurring through inductive coupling between power transmission line 4 and pickups 3a, 3b and 3c.

Figure 4:
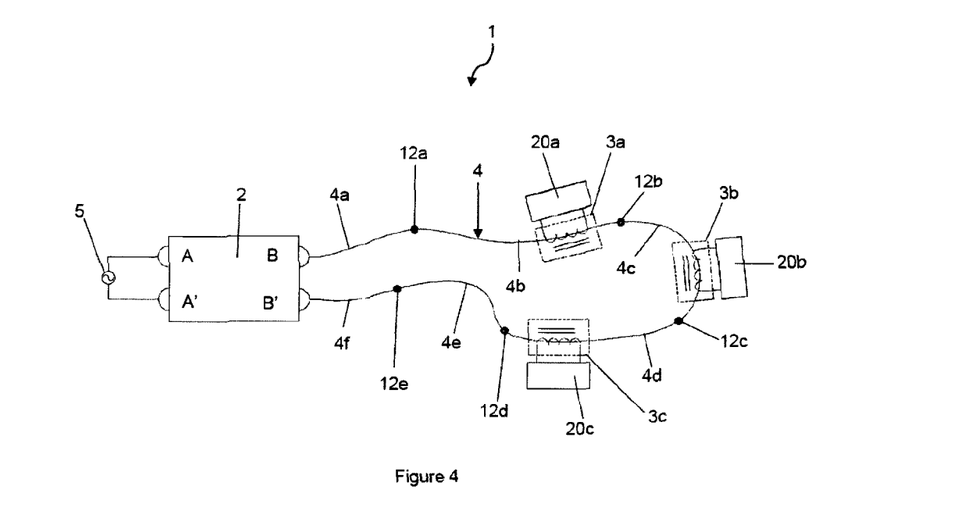
FIG. 4 is a schematic view of the power supply system of FIGS. 1 and 2 including releasable connections.

With respect to FIG. 4 there is shown the power supply system of FIG. 1 including releasable connections 12a, 12b, 12c, 12d and 12e which separate power transmission line 4 into sections 4a, 4b, 4c, 4d, 4e and 4f. Disconnecting any one of connections 12a, 12b, 12c, 12d or 12e allows a pickup to be threaded over that connection and onto a section 4a, 4b, 4c, 4d, 4e or 4f of power transmission line 4. In this manner an unbroken section of transmission line may be used in a hazardous region by connecting the section of transmission line to the main transmission line outside of the hazardous area.

Figure 5:
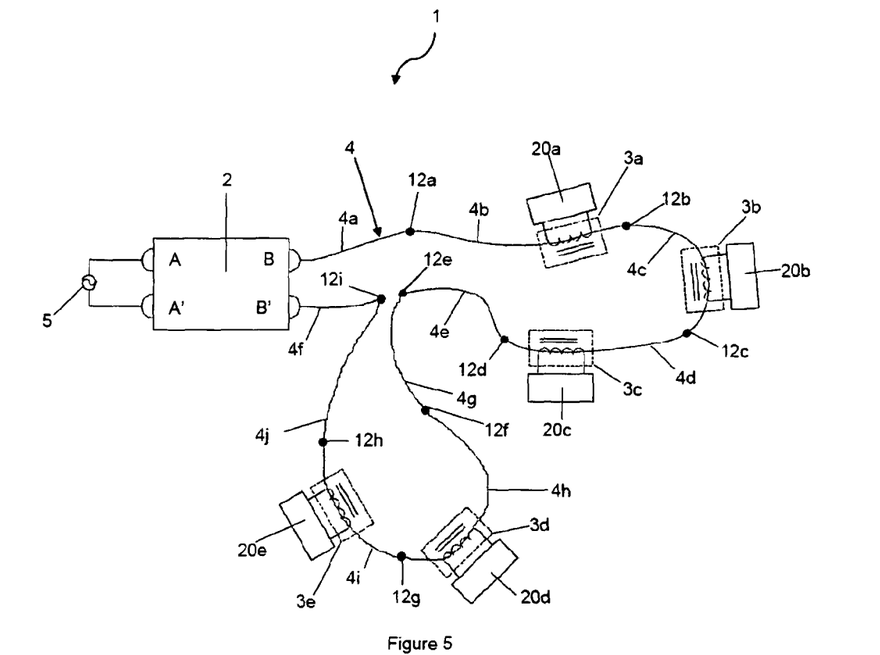
FIG. 5 is a schematic view of the power supply system of FIG. 4 including an additional length of power transmission line.

With respect to FIG. 5 there is shown the power supply system of FIG. 4 in which releasable connection 12e has been disconnected and a further four sections of transmission line 4g, 4h, 4i and 4j have been attached to the power transmission line 4. Further pickup 3d has been threaded onto section 4h and pickup 3e has been threaded onto section 4i.

With reference to any of FIGS. 1, 2, 4 and 6 there are shown pickups 3a, 3b, 3c. FIG. 5 includes pickups 3a, 3b and 3c as well as additional pickups 3d and 3e. Pickups 3a, 3b, 3c, 3d and 3e are configured to inductively couple to the power transmission line. This allows the pickups to be moved relative to, and placed at any point along the length of, the power transmission line 4. In order to achieve efficient inductive coupling the pickups are configured to surround the power transmission line 4, as is known in the art. Pickups will typically include a solid core formed from amorphous steel ribbon such as, for example, Metglas 2605SA1 ribbon. However, where temporary devices, such as diagnostic tools or temporary lights, are coupled to the power transmission line 4, a two part core may be used in the pickup. A two part core allows for a pickup to be separated, fitted over the power transmission line 4 and rejoined, all without the need for disconnecting the power transmission line 4. A separable core is less efficient than a solid core, but is more convenient to couple to the power transmission line 4.

Each pickup 3a, 3b, 3c, 3d and 3e includes a circuit 20a, 20b, 20c, 20d, 20e attached thereto. Circuits 20a, 20b, 20c, 20d, 20e are supplied with electrical energy by way of an associated pickup. Each circuit 20a, 20b, 20c, 20d or 20e can draw a varying power at a constant power transmission line 4 current.

Figure 6:
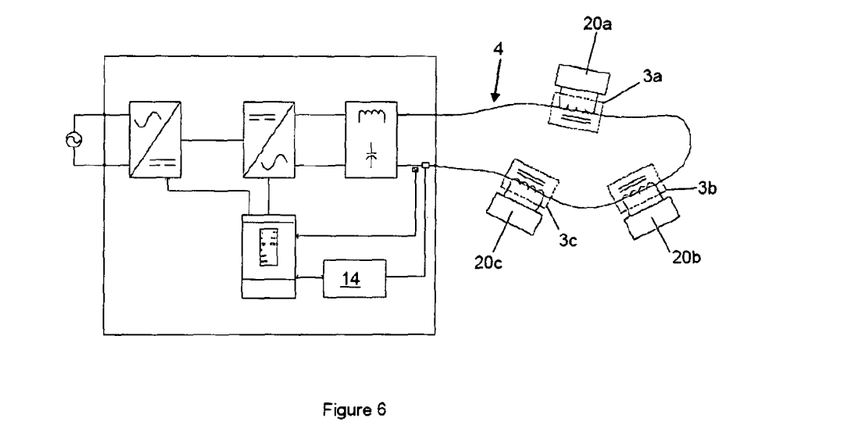
FIG. 6 is a schematic view of a power supply system in accordance with an embodiment of the present invention which includes a communications interface.

With reference to FIG. 6 there is shown the power supply system of FIG. 2 in which a communications interface 14 has been provided. Communications system 14 is configured to transmit and receive signals on power transmission line 4. Pickups 3a, 3b, 3c are inductively coupled to power transmission line 4 and therefore are capable of inductively receiving signals transmitted on power transmission line 4. One or more of circuits 20a, 20b or 20c includes a communications interface (not shown) which is configured to detect and decode signals received by an associated pickup 3a, 3b or 3c. The communications interface on said one or more of circuits 20a, 20b or 20c is capable of communicating signals onto power transmission line 4 by way an associated pickup. In this manner two way communications is possible between circuits 20a, 20b and 20c coupled to the power transmission line 4 and the Communications system 14. It will be appreciated by persons skilled in the art that two way communications may be used for, but should not be limited to, control of one or more circuits from a separate circuit, or diagnostic testing of a remotely positioned circuit from another circuit communicatively coupled to the power transmission line. Aspects of the present invention have been described by way of example only and it should be appreciated that modifications and additions may be made thereto without departing from the scope thereof.

The claims defining the invention are:

1. A power supply system including:
a power supply configured to provide an AC current with a constant magnitude and a sinusoidal waveform having a frequency between 500 Hz and 1000 Hz, wherein the power supply is configured to produce a pulse width modulated output, and the power supply includes a low pass filter capable of filtering high frequency components from the pulse width modulated output;
a power transmission line connected to the power supply to form a closed circuit; and
a plurality of pickups configured to accept and slidingly engage with the power transmission line such that each pickup completely encircles a portion of the power transmission line threaded through said pickup, and to inductively couple to the power transmission line,
wherein each of the plurality of pickups can be positioned at any point along the length of the power transmission line by being slid along the power transmission line.

2. The power supply system of claim 1 wherein the power supply system is supplied by a mains power source.

3. The power supply system of claim 1 wherein the power supply incorporates a portion for storage of electrical energy.

4. The power supply system of claim 1 wherein the power supply provides an isolation point between the mains input supply and the power supply output.

5. The power supply system as claimed in claim 1 wherein the filtered pulse width modulated output comprises the AC waveform having a frequency of between 500 Hz and 800 Hz.

6. The power supply system as claimed in claim 5 wherein the AC waveform has a frequency of 600 Hz.

7. The power supply system of claim 1 wherein the power transmission line comprises a plurality of power transmission line sections which are joined by way of releasable electrical connections to form a closed circuit.

8. The power supply system of claim 7 wherein the releasable electrical connections are configured to pass through the pickup to allow for the pickup to slide over the releasable electrical connections and onto a section of power transmission line.

9. The power supply system of claim 1 wherein the power transmission line comprises a plurality of separate transmission lines.

10. The power supply system of claim 1 wherein the power transmission line is configured to propagate communications signals induced thereon.

11. The power supply system of claim 1 wherein each pickup is formed from a solid core that is configured to completely encircle a portion of the power transmission line threaded through the pickup.

12. The power supply system of claim 11 wherein the solid core is formed from amorphous steel.

13. A power supply system including:
a power supply configured to provide an AC current with a constant magnitude and a sinusoidal waveform having a frequency between 500 Hz and 1000 Hz, wherein the power supply includes an inverter circuit configured to provide an AC output and produces a pulse width modulation frequency of between 20 kHz and 40 kHz;
a power transmission line connected to the power supply to form a closed circuit; and
a plurality of pickups configured to accept and slidingly engage with the power transmission line such that each pickup completely encircles a portion of the power transmission line threaded through said pickup, and to inductively couple to the power transmission line,
wherein each of the plurality of pickups can be positioned at any point along the length of the power transmission line by being slid along the power transmission line.

14. The power supply system as claimed in claim 13 wherein the inverter is pulse width modulated at a frequency of 32 kHz.

15. The power supply system as claimed in claim 13 wherein the pulse width modulated output has an underlying pulse train corresponding to the sinusoidal waveform.

16. The power supply system as claimed in claim 15 wherein the underlying pulse train has a frequency of between 500 Hz and 800 Hz.

17. The power supply system as claimed in claim 16 wherein the underlying pulse train has a frequency of 600 Hz.

18. A power supply system including:
a power supply configured to provide an AC current with a constant magnitude and a sinusoidal waveform having a frequency between 500 Hz and 1000 Hz;
a power transmission line connected to the power supply to form a closed circuit; and
a plurality of pickups configured to accept and slidingly engage with the power transmission line such that each pickup completely encircles a portion of the power transmission line threaded through said pickup, and to inductively couple to the power transmission line,
wherein each of the plurality of pickups can be positioned at any point along the length of the power transmission line by being slid along the power transmission line,
wherein the power supply actively monitors the power transmission line to dynamically maintain a constant current therethrough, and
wherein the constant current level can be adjusted by a user of the power supply system.

19. A power supply system including:
a power supply configured to provide an AC current with a constant magnitude and a sinusoidal waveform having a frequency between 500 Hz and 1000 Hz;
a power transmission line connected to the power supply to form a closed circuit; and
a plurality of pickups configured to accept and slidingly engage with the power transmission line such that each pickup completely encircles a portion of the power transmission line threaded through said pickup, and to inductively couple to the power transmission line,
wherein each of the plurality of pickups can be positioned at any point along the length of the power transmission line by being slid along the power transmission line, and
wherein the power transmission line includes a separate communications line.

20. A circuit including a pickup, the pickup configured to be used with a power supply system, the system having a power supply configured to provide an AC current with a constant magnitude, and a sinusoidal waveform having a frequency between 500Hz and 1000Hz, to a power transmission line connected to the power supply to form a closed circuit,
- wherein the pickup is configured, in use, to thread onto and to inductively couple to the power transmission line such that the pickup completely encircles a portion of the power transmission line threaded through the pickup and wherein the pickup is capable of being positioned at any point along the length of the power transmission line by sliding the pickup along the power transmission line,
- wherein the power supply is configured to provide power to a plurality of said pickups,
- the circuit including a switched mode power supply configured to supply a load of varying wattage whilst drawing a constant current input,
- the circuit further including a communications interface configured to receive signals transmitted on the power transmission line and inductively communicated to the communications interface by way of the pickup, wherein the circuit can be remotely controlled by way of the received signals.

21. The circuit of claim 20 wherein the communications interface is capable of transmitting signals by inductively coupling said signals to the power transmission line.

22. A method of controlling a circuit including a pickup inductively coupled to a power transmission line, the power transmission line connected to form a closed loop with a power supply configured to provide an AC current with a constant magnitude and a sinusoidal waveform having a frequency between 500Hz and 1000Hz through the power transmission line to a plurality of pickups, the method including:
- operating a communications interface associated with the power supply to transmit a signal on the power transmission line, the signal configured to provide instructions to the circuit, wherein the communications interface associated with the power supply is configured to receive signals from an external source;
- receiving the signal by way of a communications interface associated with the circuit, and
- operating the circuit in accordance with the instructions within the transmitted signal,
- wherein the pickup is configured to accept and slidingly engage with the power transmission line such that the pickup completely encircles a portion of the power transmission line threaded through it, and to inductively couple to the power transmission line wherein the pickup can be positioned at any point along the length of the power transmission line by sliding it along the power transmission line.

23. The method as claimed in claim 22 wherein the signal from an external source is received by one or more of: an internet connection, a wireless connection, a cellular network connection, an interface with a control panel.

* * * * *